Jan. 16, 1968   D. J. CORNELSEN ET AL   3,363,647
RAPIDLY REMOVABLE VALVE COVER ASSEMBLY
Filed Sept. 16, 1965   2 Sheets-Sheet 1
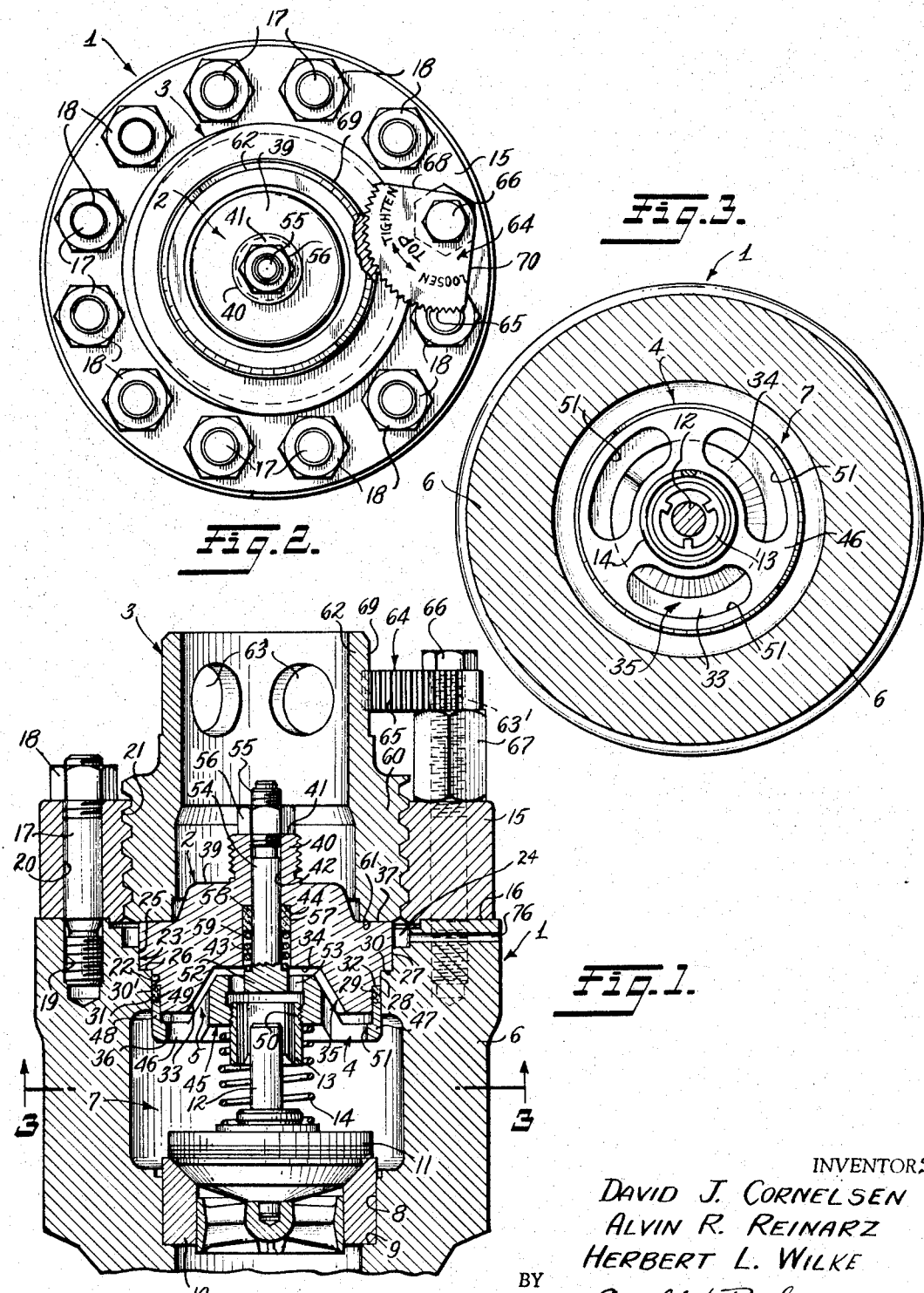
INVENTORS
DAVID J. CORNELSEN
ALVIN R. REINARZ
HERBERT L. WILKE
BY Arnold & Roylance
ATTORNEYS Jan. 16, 1968   D. J. CORNELSEN ETAL   3,363,647
RAPIDLY REMOVABLE VALVE COVER ASSEMBLY
Filed Sept. 16, 1965                                    2 Sheets-Sheet 2

INVENTORS
DAVID J. CORNELSEN
ALVIN R. REINARZ
HERBERT L. WILKE
BY
Arnold & Roylance
ATTORNEYS United States Patent Office 3,363,647
Patented Jan. 16, 1968

3,363,647
RAPIDLY REMOVABLE VALVE
COVER ASSEMBLY
David J. Cornelsen and Alvin R. Reinarz, Gainesville, and Herbert L. Wilke, Houston, Tex., assignors to Armco Steel Corporation, Middletown, Ohio, a corporation of Ohio
Filed Sept. 16, 1965, Ser. No. 487,720
13 Claims. (Cl. 137—542)

This invention relates generally to a cover assembly for the valve pot of a heavy-duty reciprocating pump, and particularly to a cover assembly which is rapidly removable to obtain access to the interior of the valve pot.

More specifically, the invention relates to a valve pot with a rapidly removable cover assembly which includes a remarkably effective, easily operable packing adjuster for energizing packing to seal the cover assembly of the valve pot.

While not limited thereto, the invention has particular application to slush pumps, i.e., pumps used in the oil well industry to pump drilling mud into a well bore. It is customary to construct such slush pumps so that the several suction and discharge valve pots each has a rapidly removable cover to obtain access to the valve located in a chamber in the valve pot. Such rapid access is highly desirable because the abrasive and corrosive properties of drilling mud tend to cause rapid deterioration of the valves and seats, and hence, require frequent maintenance.

During operation of the pump, both the suction and discharge valve pots are subjected to pulsating pressure. The pressure reversals due to such pulsations, in the suction pot are, however, much greater than those encountered in the discharge pot because the suction pot is subjected to a relatively low pressure during the intake stroke of the pump and to a very high pressure, during the discharge stroke of the pump. Since discharge pressures upward of 5,000 lbs. sq. in. are not unusual, it is to be appreciated that the valve pots are subjected to extreme pressure fluctuations, and hence, stress reversals. These stress reversals combined with vibration of the pump during operation frequently cause threaded connections to loosen especially where the slope of the threads is relatively steep, such as those on the cover fastener of a rapidly removable cover assembly. Hence, it has been found highly desirable to provide a locking device to prevent such stress reversals and vibration from loosening the cover assembly of a quick change valve pot.

Another problem encountered in slush pumps is that most threaded connections exposed to the fluid within a valve pot quickly corrode with corresponding locking of the threads which makes removal virtually impossible without destroying the threaded connection. In prior art structures employing a valve cover with a separately adjustable packing energizer, the construction was such that either the threaded connection between the packing energizer and its adjusting bolt were exposed to the corrosive fluid in the pump or the packing energizer was so constructed that fluid did not normally communicate with the region between the valve pot cover and the packing energizer. However, if such communication is prevented, the full pulsating pressure within the valve pot acts on the end of the packing energizer which faces the valve. Hence, the energizer must be made sufficiently strong to withstand the pressure within the valve pot. Also, the adjusting arrangement must be very heavy to withstand the pressures and hence is expensive. The greatest problem, however, is that the valve pot cover, which is in reality the strongest portion of the cover assembly, is not directly exposed to the high pressure fluid but acts merely as a support for the packing energizer. As is apparent, such a construction has numerous disadvantages and failures frequently occur.

Applicant's improved valve pot and cover assembly avoids the problems encountered in the past by providing a rapidly removable valve pot cover with a packing energizer arrangement that works remarkably well. In applicant's arrangement, the packing energizer is provided with openings to intentionally allow fluid to pass into the space between the packing energizer and the inner surface of the valve pot cover. By virtue of this arrangement, there is only a relatively small unbalanced hydraulic force acting on the packing energizer. Another noteworthy advantage of applicant's structure is the absence of any adjusting mechanisms, such as threaded connectors, exposed to the fluid in the valve pot, or located in areas where fluid which may leak from the valve pot can contact these members. Another feature of applicant's invention is the construction of a cover fastener which also acts as a shield to prevent damage to the adjusting stud of the packing energizer. Further, the cover fastener is provided with a conveniently located tool engaging portion which permits rapid removal of the cover fastener. In addition, a locking device is provided which positively prevents rotation of the cover fastener, to loosen same, due to reverse pressures and vibration of the pump in operation.

Another basic advantage of applicant's structure is the cooperation of the cover fastener, cover, and packing energizer to provide a rapidly removable valve pot cover in which there is no relative rotation between the cover and the valve pot during assembly, which rotation would normally damage packing interposed between the cover and a cooperating portion of the valve pot. Since rotation is avoided, it is assured that the packing is never damaged during installation of the cover, and in addition, the packing can preloaded or energized manually by adjustment of the packing energizer. In addition, the valve pot, cover and cover fastener are each of metal and are so constructed that the cover is securely held down solely by metal-to-metal contact between the cover fastener and valve pot.

Accordingly, an object of this invention is a valve pot and cover assembly particularly characterized by rapid removal of the cover to obtain access to the valve within the valve pot.

Another object is a valve pot and cover assembly in which the cover is securely held down by virtue of metal-to-metal contact between the cover and valve pot, and the cover fastener and cover.

A further object is a quickly removable cover assembly for a valve pot, the cover having a packing element to seal the valve pot and including a packing energizer to adjust the packing.

A further object is a valve pot and cover assembly including a packing energizer which is vented to permit fluid in the valve pot to communicate with the region between the packing energizer and the valve pot cover, to thus substantially balance the hydraulic forces acting on the packing energizer and expose the valve pot cover to resist the full hydraulic load of pressures in the valve chamber.

A still further object is a valve pot and cover assembly including an adjustable packing energizer so arranged that the adjustable connection of the energizer is located outside the valve pot so as not to be exposed to the corrosive fluid therein, but is disposed within the confines of the side wall of a cover fastener to further protect the connection.

A still further object is a valve pot and cover assembly, the cover assembly being quickly removable and being so arranged that no relative rotation between cover and packing, which would tend to damage the packing, occurs when the cover is installed.

Another and further object is a unique locking device to positively prevent unthreading of the cover assembly during operation of the pump.

A further and most significant object is a cover assembly having the advantages of the above objects, which is relatively inexpensive, durable, and remarkably efficient.

In order that the manner in which these and other objects are obtained in accordance with the invention can be understood in detail, reference is had to the accompanying drawings which form part of the specification, and wherein:

FIG. 1 is a view in longitudinal section through a portion of the valve pot of a slush pump embodying the invention:

FIG. 2 is a plan view of the valve pot of FIG. 1;

FIG. 5 is a plan view of FIG. 4.

Figure 3:
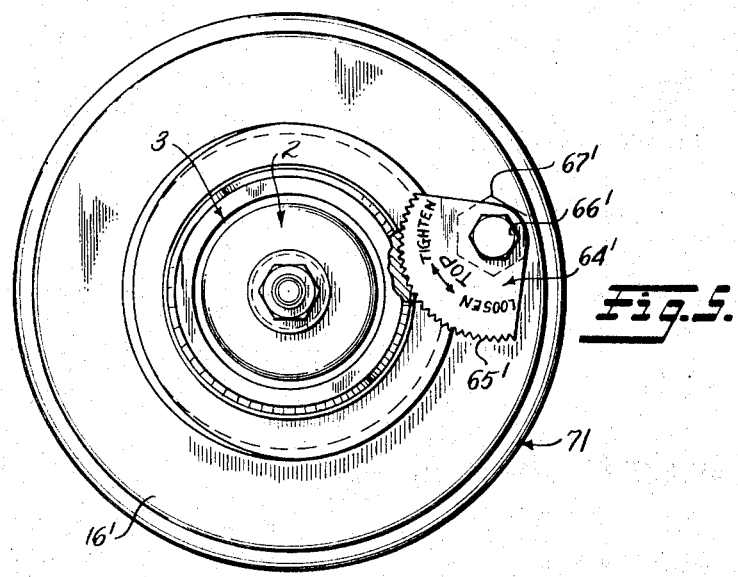
FIG. 3 is a sectional view taken along lines 3—3 of FIG. 1.

Referring now to the drawings in detail, and particularly FIGS. 1 and 2, there is shown a valve pot assembly comprised of a valve pot 1, a cover in the form of a cylindrical plug 2, a tubular cover fastener 3, and a packing energizer 4 carried by the cover 2 adjacent an inner end 5 of the cover.

Valve pot 1 includes a cylindrical side wall 6 which defines a valve chamber 7. Side wall 6 is machined adjacent the lower end of valve chamber 7 to provide a cylindrical opening 8 terminating at a flat face 9 to accommodate a valve seat assembly 10. A valve 11 has a stem 12 which extends into a guide sleeve 13, the valve reciprocating during operation of the pump and being normally urged against valve seat assembly 10 by the bias of a helically wound compression spring 14.

A flat thick metal ring 15, which serves as an extension of side wall 6, abuts end face 16 of the side wall and is secured thereto with a plurality of studs 17 and nuts 18. The studs are threaded into a plurality of axially extending drilled and tapped openings 19 so arranged that the studs 17 are grouped symmetrically about the axis of valve pot 1. Ring 15 has similarly arranged openings 20 and has an internally threaded axially extending bore 21, the diameter of which is greater than the diameter of plug 2, valve seat assembly 10, and valve 11 so that these members can be removed through bore 21 without unfastening the ring. The threads of bore 21 are coarse and of steep slope to permit rapid removal and replacement of the correspondingly threaded cover fastener 3. Between ring 15 and valve chamber 7, the valve pot is machined to provide a smooth through bore 22 and counterbores 23 and 24. Counterbore 23 provides an internal cylindrical surface 25 which terminates at an annular abutment surface 26 that faces toward the open end of valve pot 1.

Plug 2 has a generally cylindrical body which is machined to present a first cylindrical portion 27, a second cylindrical portion 28, and a third cylindrical portion 29, all concentric with the axis of valve pot 1. Cylindrical portion 28 is of smaller diameter than cylindrical portion 27 so that the material joining the two portions presents a first annular abutment shoulder 30 facing toward annular abutment surface 26. Cylindrical portions 27 and 28 are dimensioned to be slidingly received in bores 22 and 25, respectively, so that plug 2 may be slipped into the valve pot with shoulder 30 in engagement with annular surface 26. With the plug so positioned, an annular space 30' is defined between cylindrical portion 29, and bore 22, to receive a packing element 31 therein. The upper end of the packing receiving space is closed by a transverse annular surface 32 which connects cylindrical portions 28 and 29 of plug 2.

Inner end 5 of plug 2 has an inner surface 33 which flares outwardly in a direction away from a transverse wall 34 to define a generally frusto-conical recess 35. Surface 33 merges with flat annular end face 36 of the plug.

The upper end of cylindrical portion 27 of plug 2 terminates at a second annular abutment shoulder 37 which faces in a direction opposite to shoulder 30. Above shoulder 37 the body of plug 2 tapers inwardly to merge with a flat portion 39 which has a centrally located cylindrical portion 40 extending axially therefrom and terminating at an end face 41 at the outer end of the plug. Plug 2 has an axially extending central bore 42 extending from end face 41 and a larger diameter bore 43 extending upwardly from transverse wall 34, to terminate at an annular face 44 parallel with and facing in the same direction as wall 34.

As best seen in FIGS. 1 and 3, packing energizer 4 is comprised of a center portion 45, a web 46 extending radially outwardly of the center portion and conforming generally to the outline configuration of recess 35, and a peripheral skirt 47 which extends upwardly from web 46 to provide an annular portion 48 which terminates at a flat end face 49. Skirt 47 has a wall thickness and diameter such that annular portion 48 closes the annular groove below packing element 31. Threaded into an opening 50 at the lower end of body portion 45 is guide sleeve 13. Web 46 is provided with opening 51 therethrough to permit fluid in valve chamber 7 to communicate with inner end 5 of cover 2. Wall 52 of center portion 45 is also provided with openings as at 53 to permit fluid to communicate with the space above valve guide 13.

Fixed at the center of wall 52 is a stud 54 of a diameter to be slidably received in bore 42, and which extends completely through cover 2 and has a threaded end 55 projecting above end face 41 of cylindrical portion 40. The packing energizer is maintained in a suspended position on plug 2 by a nut 56 screwed onto threaded end 55. The second packing receiving groove 57 is defined between bore 43 and the cylindrical surface of stud 54 which extends through the bore. The upper end of groove 57 is closed by annular face 44. A second packing element 58 is mounted in a groove 57 and is held therein by the action of helically wound compression spring 59 which seats on the surface of wall 52 that faces toward wall 34. Spring 59 is so dimensioned that it extends into groove 57 as best seen in FIG. 1.

Cover fastener 3 is tubular, has an externally threaded body 60 terminating at an annular abutment surface 61 at its lower end, and has an upwardly extending tubular side wall 62 provided with diametrically aligned openings 63 to receive a tool in the form of a pipe or shaft to remove and replace the cover fastener. Side wall 62 is sufficiently long that openings 63 are located well beyond the end of stud 54 and, hence, the possibility of damage to the stud, by the tool used to remove cover fastener 3, is eliminated.

Cover fastener 3 is locked in position by a locking device in the form of a cam 64 with a curved serrated face 65 which engages the outer surface of side wall 62. As shown in FIG. 1, cam 64 has an opening 63' to receive a shaft in the form of a bolt 66 about which the cam freely pivots after bolt 66 is threaded into an axially elongated extension nut 67 mounted on one of studs 17 and tightened. Cam 64 is so dimensioned that the distance from serrated face 65, adjacent edge 68, to the axis of bolt 66 is less than the distance from the outer surface 69 of side wall 62 to the axis of the bolt. However, the distance from the axis of bolt 66 to the portion of serrated face 65 adjacent edge 70 of the cam is somewhat greater than the distance from the axis of the bolt to the outer surface 69 of side wall 62. Since face 65 curves arcuately between edges 68 and 70, movement of cam 64 in a clockwise direction as viewed in FIG. 2 causes the sharp teeth in serrated face 65 to bite into surface 69 of the side wall, and hence, lock the cover fastener against rotation. Since cover fastener 3 and bore 21 are each right-hand threaded, the cover fastener can loosen only by rotating counterclockwise, as viewed in FIG. 2. Such counterclockwise rotation is, however, prevented by wedging action of cam 64.

Figure 4:
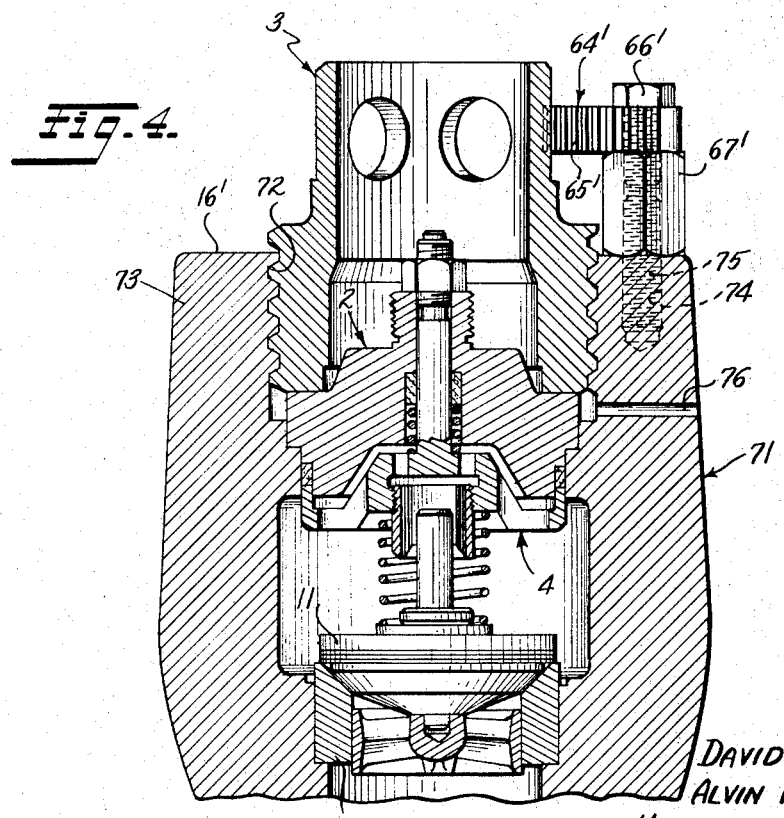
FIG. 4 is a sectional view corresponding to FIG. 1 and showing a second type of valve pot with which the invention may be used.

FIGS. 4 and 5 shown a second type of valve pot with which the cover assembly of this invention may be used. As shown, valve pot 71 is of integral construction, with an internally threaded bore 72 provided in the material of side wall 73 adjacent the open end of the valve pot. The only difference between the valve pot and cover assembly of FIG. 1 and that of FIG. 4 is that ring 15 of FIG. 1 is eliminated in the FIG. 4 construction, and is in essence made integral with the side wall of valve pot 71. Since the only difference is the integral structure of the side wall, the explanation of the other details of the structure of valve pot and cover assembly will not be restated. It is thus to be understood that valve seat assembly 10, valve 11, plug 2, and packing energizer 4 of FIGS. 4 and 5 are all identical to the corresponding elements of FIGS. 1–3, and can be removed from the valve pot through bore 72. Similarly, cover fastener 3 of FIGS. 4 and 5 is identical with cover fastener 3 of FIGS. 1–3. Since valve pot 71 does not require studs 17, it is necessary to drill and tap the side wall at face 16′ to provide only one axially extending threaded opening 74 to receive a stud 75. Then, an extension nut 67′, identical to nut 67 of FIG. 1, a locking cam 64′ with serrated face 65′, and a bolt 66′ are provided, these elements being identical with the elements 64–67, respectively, of the FIGS. 1–3 embodiment. In both the valve pots of FIGS. 1–3 and FIGS. 4 and 5, the locking cam is segment-shaped and is mounted for movement in a plane spaced above the outer end of the valve pot.

*Assembly*

Assuming that the valve pot of FIGS. 1–3 is disassembled and cover fastener 3, plug 2, packing energizer 4, and ring 15 are removed from the valve pot, the assembly procedure is as follows. First ring 15 is secured to the valve pot with studs 17 and nuts 18. After valve seat assembly 10, valve 11, and valve spring 14 are inserted into valve chamber 7, through threaded bore 21 of ring 15, packing energizer 4 is assembled to plug 2. The first step in such assembly is to place spring 59 and second packing element 58 on stud 54 of packing energizer 4. Packing element 31 is next positioned against annular surface 32 of the plug. The stud 54 of packing energizer 4 is then inserted through bore 42, and nut 56 is loosely threaded on end 55. Nut 56 is advanced on end 55 until end face 49 of skirt 47 just engaged packing element 31. The packing energizer and cover assembly is then carefully lowered into the open end of the valve pot until valve stem 12 extends into guide sleeve 13 and abutment shoulder 30 of the cover seats against abutment surface 26 of the valve pot.

Cover fastener 3 is then threaded into threaded opening 21 of ring 15 so that its annular end face 61 engages annular abutment shoulder 37 of the cover. A pipe or bar is then inserted through openings 63 for leverage and the cover fastener is tightened to securely clamp plug 2 between end face 61 of the cover fastener and abutment surface 26 of the valve pot. It is to be noted that the cover is held securely in metal-to-metal contact by cover fastener 3 and valve pot 1 and that no gaskets or packing are involved in this hold-down arrangement. An extension nut 67 is then threaded onto one of studs 17 and bolt 66 is then passed through the opening in cam 64 and the bolt threaded into the upper end of the extension nut. After bolt 66 is tightened, cam 64 is turned to the position of FIG. 2 and then moved further clockwise so that the teeth of serrated face 65 are forced into surface 69 of cover fastener 3. Packing adjusting nut 56 is then rotated to force end face 49 of skirt 47 against the packing to compress same axially. During such axial compression, the packing also expands radially to effectively seal the plug to the valve pot. At the same time, packing preload spring 59 is further compressed to assure that second packing element 58 is sufficiently preloaded to prevent leaking through bore 42 when the pump is in operation.

With the pump in operation, the pumped fluid fills valve chamber 7 and the valve pot is subjected to extreme pressure fluctuations during a pumping cycle. If packing 31 is not sufficiently energized, a leak may occur which is easily detected by the presence of fluid discharging from telltale hole 76. When such a leak is observed, packing adjusting nut 56 is again manipulated to further compress the packing until it seals properly.

It is to be noted with particularity that vent openings 51 and 53 in packing energizer 4 permit the fluid in valve chamber 7 to flow between plug 2 and the packing energizer to effectively balance most of the hydraulic force of the pumped fluid, which tends to force the packing energizer upwardly, as viewed in FIG. 1. Due to such venting, the only unbalanced hydraulic force acting on the packing energizer is that due to the action of fluid pressure on the effective transverse areas of bolt 54 and annular portion 48 of skirt 47. Since these transverse areas are relatively small, the hydraulic force tending to force the packing energizer upwardly is correspondingly small and the structure of the packing energizer need not be as heavy, and hence expensive as prior art packing energizer structures without vent openings such as 51 and 53. It is to be appreciated that the absence of openings 51 and 53 would seal the space between the plug and packing energizer against entry of fluid and hence, the hydraulic force acting on the packing energizer would at least be as great as that acting on inner end 5 of plug 2. Because of the relatively low unbalanced hydraulic pressure to which the packing energizer is subjected, the reaction of packing 31 against face 49 of the packing energizer, and the reaction of second packing 58 and spring 59 are sufficient to resist upward movement of the packing energizer while the pump is in operation. Hence, it is apparent that the packing energizer is essentially free floating in that there is no positive restraint to upward movement of the packing energizer, the somewhat resilient restraint of packings 31 and 58 being sufficient.

An additional substantial advantage of applicant's construction is the absence of any threaded or adjusting connections of the packing energizer exposed to the fluid in valve chamber 7. Instead, the adjusting connection provided by threaded portion 55 of stud 54 and nut 56 are located outside the valve chamber. This feature is quite important since the corrosive action of the pumped fluid usually causes threaded connections to freeze or otherwise become unserviceable in a very short time.

The assembly procedure for the valve pot of FIGS. 4 and 5 is the same as that described for the valve pot of FIGS. 1–3 save that the step of securing ring 15 to the end of valve pot 1 is of course, not necessary during the assembly of valve pot 71.

It is to be appreciated with reference to the drawings that stud 54 terminates a sufficient distance below openings 63 that a pipe or bar inserted through the openings is spaced from the upper end of the stud and hence, the possibility of damaging threaded portion 55 of the stud is substantially eliminated. Also, side wall 62 of cover fastener 3 encircles and extends considerably beyond threaded portion 55 of stud 54 and hence, accidental damage to the stud by falling objects or workmen is prevented.

Although a preferred embodiment of a valve pot assembly including cover, cover fastener and packing energizer has been shown and described, it is to be understood that the construction of this invention is not limited

What is claimed is:

1. In a heavy duty reciprocating pump, a valve pot and cover assembly comprising, in combination,
   a valve pot having an open end and comprising
      a side wall defining a valve chamber,
      an annular abutment surface facing toward said open end,
      a bore, and
      a threaded portion adjacent said open end;
   a cover having an inner end facing said valve chamber and an outer end, said cover closing said open end of said valve pot and comprising
      a generally cylindrical body portion having an opening therein,
      a first annular abutment shoulder facing toward and in engagement with said abutment surface of said valve pot,
      a second annular abutment shoulder facing in a direction opposite to said first abutment shoulder, and
      a peripheral face concentric with but of smaller diameter than said bore of said valve pot to define an annular space therebetween;
   a packing energizer comprising
      a center portion,
      a skirt having an annular portion extending into said annular space and terminating at an end face,
      a web connecting said center portion to said skirt;
   said packing energizer extending across said inner end of said cover and having openings therein whereby one side of said energizer is in fluid communication with the other side;
   a packing element in said annular space and energizable by said packing energizer to seal said cover to said valve pot;
   force transmitting means extending through said opening of said cover and connected to said packing energizer;
   force creating means outside said valve pot and operable to energize said packing by pressing said end face of said skirt toward said packing, said force creating means being connected to said force transmitting means;
   a rapidly removable cover fastener comprising
      a threaded body portion, and
      an abutment surface;
   said body portion of said cover being threaded into said threaded portion of said valve pot to force said abutment surface thereof against said second annular shoulder of said cover to rigidly clamp said cover between said cover fastener and said annular abutment surface of said valve pot.

2. A valve pot and cover assembly in accordance with claim 1 in which
   said open end of said valve pot is defined in part by a ring fixed to the side wall of the valve pot with a plurality of threaded fasteners, and
   said threaded portion of said valve pot is formed in said ring.

3. A valve pot and cover assembly in accordance with claim 1 and which further includes
   a locking device engageable with said cover fastener to lock same against rotation relative to said valve pot.

4. A valve pot and cover assembly in accordance with claim 1 in which
   said inner end of said cover has a recess with inwardly sloping sides, and
   the end of said packing energizer adjacent the inner end of said cover conforms generally to the configuration of said inner end.

5. A valve pot and cover assembly in accordance with claim 1 in which
   said cover fastener is of integral construction and further includes a tool engageable portion beyond the open end of said valve pot to facilitate rapid removal of said cover fastener;
   said tool engageable portion being spaced from said force transmitting means.

6. A valve pot and cover assembly in accordance with claim 1 in which
   said force transmitting means has a cylindrical portion,
   the inner end of said opening of said cover is enlarged adjacent said cylindrical portion to define an annulus therebetween, and
   a second packing element is positioned in said annulus to seal said cover opening.

7. A valve pot and cover assembly in accordance with claim 6 which further includes
   resilient means supported by said packing energizer and effective to preload said second packing element.

8. A valve pot and cover assembly in accordance with claim 1 in which
   said packing energizer further includes an opening facing toward said valve chamber and adapted to receive a sleeve to guide the stem of a valve element in said valve chamber.

9. A valve pot and cover assembly in accordance with claim 3 in which
   said cover fastener has a cylindrical surface at a location spaced axially from the open end of said valve pot, and
   said locking device is a cam with a serrated face mounted for movement into and out of engagement with said cylindrical surface of said cover fastener.

10. In a heavy duty reciprocating pump, a valve pot and cover assembly comprising, in combination, a valve pot having an open end and comprising
   a side wall defining a valve chamber,
   an annular abutment surface between said valve chamber and said open end, and facing toward said open end,
   a smooth bore adjacent said annular abutment surface, and
   a threaded bore adjacent said open end;
a cover having an inner end facing said valve chamber and an outer end, said cover closing said open end of said valve pot and comprising
   a cylindrical body portion having a centrally located opening therein,
   a first annular abutment shoulder facing toward and in engagement with said abutment surface of said valve pot,
   a second annular abutment shoulder of approximately the same diameter as said first annular abutment shoulder and facing in a direction opposite to said first abutment shoulder,
   a peripheral face concentric with but of smaller diameter than said smooth bore of said valve pot to define an annular space therebetween, and
   an annular surface extending across an end of said annular space;
a packing energizer comprising
   a center portion,
   a skirt having an annular portion extending into said annular space and terminating at a flat end face spaced from said annular surface of said cover, and
   a web connecting said center portion to said skirt,
said packing energizer extending across said inner end of said cover and having openings therein whereby one side of said energizer is in fluid communication with the other side;
a packing element in said annular space said packing element being energizable by said packing energizer to seal said cover to said valve pot;

a force transmitting member extending through said central opening of said cover and fixed to said center portion of said packing energizer;

force creating means connected to said force transmitting member at a location outside the valve pot and operable to energize said packing by moving said end face of said skirt toward said packing to compress same between said end face and said annular surface of said cover;

a rapidly removable cover fastener comprising
a tubular body having external threads, and
an abutment surface adjacent one end of said tubular body;

said body portion of said cover fastener being threaded into said threaded bore of said valve pot to force said abutment surface thereof against said second annular shoulder of said cover to rigidly clamp said cover between said cover fastener and said annular abutment surface of said valve pot; and said force creating means and said force transmitting member each terminating within said tubular body of said cover fastener to prevent accidental damage thereto.

11. A valve pot and cover assembly in accordance with claim 10 in which
said force transmitting member is cylindrical and has threads on the portion thereof extending through said opening of said cover, and
said force creating means is a threaded member threaded onto said threaded portion of said force transmitting means.

12. A valve pot and cover in accordance with claim 10 in which
an elongated shaft is connected to said side wall of said valve pot to extend axially therefrom, and
a locking device in the form of a cam with a serrated face is mounted for movement about the axis of said shaft to
one position in which said serrated face engages the cover fastener to lock same against rotation during operation of the pump, and
another position in which said serrated face is spaced from said cover fastener whereby said cover fastener can be unthreaded from said valve pot.

13. A valve pot and cover in accordance with claim 10 in which
the open end of said valve pot is defined by a thick ring, and said threaded bore is in said ring;
said ring being secured to said side wall with a plurality of fasteners parallel with and symmetrically disposed relative to the axis of the valve pot, one of said fasteners being elongated;
a locking device in the form of a cam with a serrated face mounted for movement about the axis of said elongated fastener to
one position in which said serrated face is spaced from said cover fastener, whereby said cover fastener can be unthreaded from said valve pot, and
another position in which said serrated face engages the cover fastener to lock same against rotation during operation of the pump.

References Cited

UNITED STATES PATENTS

| | | | |
|---|---|---|---|
| 1,983,797 | 12/1934 | Greve. | |
| 2,143,399 | 1/1939 | Abercrombie | 137—540 |
| 2,277,975 | 3/1942 | Heggem | 251—367 X |
| 2,353,549 | 7/1944 | Dalzell et al. | 251—367 X |
| 3,179,279 | 4/1965 | Bradley et al. | 220—24.5 |

WILLIAM F. O'DEA, *Primary Examiner.*

D. H. LAMBERT, *Assistant Examiner.*